US008605952B2

(12) United States Patent
Boushey et al.

(10) Patent No.: US 8,605,952 B2
(45) Date of Patent: *Dec. 10, 2013

(54) DIETARY ASSESSMENT SYSTEM AND METHOD

(71) Applicant: Purdue Research Foundation, West Lafayette, IN (US)

(72) Inventors: Carol Boushey, West Lafayette, IN (US); Edward John Delp, West Lafayette, IN (US); David Scott Ebert, West Lafayette, IN (US); Kyle DelMar Lutes, West Lafayette, IN (US); Deborah Kerr, Bentley (AU)

(73) Assignee: Purdue Research Foundation, Inc., West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/728,414

(22) Filed: Dec. 27, 2012

(65) Prior Publication Data
US 2013/0113933 A1 May 9, 2013

Related U.S. Application Data

(63) Continuation of application No. 12/553,597, filed on Sep. 3, 2009, now Pat. No. 8,363,913.

(51) Int. Cl.
*G06K 9/00* (2006.01)
(52) U.S. Cl.
USPC ........... 382/110; 382/128; 382/218; 600/301; 128/921; 434/127

(58) Field of Classification Search
USPC ................. 382/110, 100, 203, 286, 128, 218; 600/593, 301, 300; 434/127, 247; 345/810; 707/709
See application file for complete search history.

(56) References Cited

U.S. PATENT DOCUMENTS

| | | | | |
|---|---|---|---|---|
| 6,508,762 | B2 * | 1/2003 | Karnieli | 600/300 |
| 8,345,930 | B2 * | 1/2013 | Tamrakar et al. | 382/110 |
| 8,363,913 | B2 * | 1/2013 | Boushey et al. | 382/128 |
| 8,439,683 | B2 * | 5/2013 | Puri et al. | 434/127 |
| 2002/0047867 | A1 * | 4/2002 | Mault et al. | 345/810 |
| 2003/0076983 | A1 * | 4/2003 | Cox | 382/110 |
| 2009/0095292 | A1 * | 4/2009 | Hamano et al. | 128/203.14 |

(Continued)

OTHER PUBLICATIONS

Chalidabhongse et al., ("2D/3D Vision-Based Mango's Feature Extraction and Sorting"), King Mongkut's Institute of Technology, Thailand, 2006.*

(Continued)

*Primary Examiner* — Hoa Pham
(74) *Attorney, Agent, or Firm* — Maginot, Moore & Beck, LLP (57) ABSTRACT

The present system and method provides a more precise way to record food and beverage intake than traditional methods. The present disclosure provides custom software for use in mobile computing devices that include a digital camera. Photos captured by mobile digital devices are analyzed with image processing and comparisons to certain databases to allow a user to discretely record foods eaten. Specifically, the user captures images of the meal or snack before and after eating. The foods pictured are identified. Image processing software may identify the food or provide choices for the user. Once a food is identified and volume of the food is estimated, nutrient databases are used for calculating final portion sizes and nutrient totals.

14 Claims, 6 Drawing Sheets

(56) References Cited

U.S. PATENT DOCUMENTS

| | | | |
|---|---|---|---|
| 2010/0173269 A1* | 7/2010 | Puri et al. | 434/127 |
| 2012/0096405 A1* | 4/2012 | Seo | 715/825 |
| 2012/0170801 A1* | 7/2012 | De Oliveira et al. | 382/103 |
| 2012/0269395 A1* | 10/2012 | Coulter et al. | 382/103 |
| 2013/0095459 A1* | 4/2013 | Tran | 434/247 |

OTHER PUBLICATIONS

Yimyam, Panitnat, et al., "Physical Properties Analysis of Mango using Computer Vision," International Conference on Control, Automation and Systems, 2005 (5 pages).

* cited by examiner

DIETARY ASSESSMENT SYSTEM AND METHOD

RELATED APPLICATIONS

This application is a continuation application of patent application Ser. No. 12/553,597, filed on Sep. 3, 2009, which claims the benefit of Provisional Patent Application No. 61/191,048, filed Sep. 5, 2008, which application is hereby incorporated by reference in its entirety.

STATEMENT REGARDING GOVERNMENT FUNDING

This invention was made with government support under U01 CA130784 and R01 DK073711 awarded by the National Institutes of Health. The government has certain rights in the invention.

BACKGROUND

1. Technical Field

This application relates to the fields of mobile phones and computing devices, digital photographs, image processing, and food databases. In particular, this application relates to the use of the above-mentioned fields in a system for recording dietary intake and analyzing nutritional content.

2. Description of the Related Art

Dietary intake provides some of the most valuable insights for mounting intervention programs for prevention of chronic diseases like obesity, for example. However, accurate assessment of dietary intake is problematic. Emerging technology in mobile telephones (cell phones) with higher resolution images, improved memory capacity, and faster processors, allow these devices to process information not previously possible. Mobile telephones and PDAs (personal digital assistants), which are widely used throughout the world, can provide a unique mechanism for collecting dietary information that reduces the burden on record keepers. Indeed, a dietary assessment application on a mobile telephone would be of value to practicing dietitians and researchers.

The increasing prevalence of obesity among younger generations is of great concern and has been linked to an increase in type 2 diabetes mellitus. Accurate methods and tools to assess food and nutrient intake are essential in monitoring the nutritional status of this age group for epidemiological and clinical research on the association between diet and health. The collection of food intake and dietary information provides some of the most valuable insights into the occurrence of disease and subsequent approaches for mounting intervention programs for prevention.

With this growing concern for obesity, the need to accurately measure diet becomes imperative. Assessment among adolescents is problematic as this group has irregular eating patterns and has less enthusiasm for recording food intake. Early adolescents, ages 11 to 14 years, in particular, are in that period of time when the novelty and curiosity of assisting in or self-reporting of food intakes starts to wane and the assistance from parents is seen as an intrusion. Dietary assessment methods need to continue to evolve to meet these challenges. There is recognition that further improvements will enhance the consistency and strength of the association of diet with disease risk, especially in light of the current obesity epidemic among this group.

Preliminary studies among adolescents suggest that innovative use of technology may improve the accuracy of diet information from young people. PDAs are ideal as a field data collection device for diet assessment; however, there have been problems when deploying these types of devices if one does not understand the user and the environment in which the device be deployed. Minimal training using mobile devices may improve the accuracy of recording.

The assessment of food intake in adolescents has previously been evaluated using more traditional methods of recording, i.e., food record (FR), the 24-hour dietary recall (24 HR), and a food frequency questionnaire (FFQ), with external validation by doubly-labeled water (DLW) and urinary nitrogen. Currently, there are too few validation studies in children to justify one particular method over another for any given study design.

A review of some of the most popular dietary assessment methods is provided below. This review demonstrates the significance of the mobile system of the present disclosure which can be used for population and clinical based studies to improve the understanding of dietary exposures among adolescents.

24-Hour Dietary Recall

The 24-hour dietary recall (24 HR) consists of a listing of foods and beverages consumed the previous day or the 24 hours prior to the recall interview. Foods and amounts are recalled from memory with the aid of an interviewer who has been trained in methods for soliciting dietary information. A brief activity history may be incorporated into the interview to facilitate probing for foods and beverages consumed. The Food Surveys Research Group (FSRG) of the United States Department of Agriculture (USDA) has devoted considerable effort to improving the accuracy of this method.

The major drawback of the 24 HR is the issue of underreporting of the food consumed. Factors such as obesity, gender, social desirability, restrained eating and hunger, education, literacy, perceived health status, age, and race/ethnicity have been shown to be related to underreporting. For example, significant underreporting of large food portions is found when food models showing recommended serving sizes were used as visual aids for respondents. Given that larger food portions have been observed as occurring over the past 20 to 30 years this may be a contributor to underreporting and methods to capture accurate portion sizes are needed. In addition, youth, in particular, are limited in their abilities to estimate portion sizes accurately. The most common method of evaluating the accuracy of the 24 HR with children is through observation of school lunch and/or school breakfast and comparing foods recalled with foods either observed as eaten or foods actually weighed. These recalls have demonstrated both under-reporting and over-reporting, and incorrect identification of foods.

The Food Record

The 24 HR is useful in population based studies; however, the preferred dietary assessment method for clinical studies is the food record. For the food record, participants are asked to record all food and beverages consumed throughout a 24-hour period. Depending on the primary nutrient or nutrients, or foods of interest, the minimum number of food records needed is rarely less than two days. Training the subjects, telephoning with reminders for recording, reviewing the records for discrepancies, and entering the dietary information into a nutrient database can take a large amount of time and requires trained individuals.

The food record is especially vulnerable to underreporting due to the complexity of recording food. It has been shown that 10-12 year old children significantly underreport total energy intake (TEI) when the intake is compared against an external marker, doubly-labeled water. In addition, as adolescents snack frequently, have unstructured eating patterns, and consume greater amounts of food away from the home, their burden of recording is much greater compared to adults. It has been suggested that these factors, along with a combination of forgetfulness and irritation and boredom caused by having to record intake frequently may be contributing to the underreporting in this age group. Dietary assessment methods perceived as less burdensome and time consuming may improve compliance.

Portion Size Estimation

Portion size estimation may be one contributor to underreporting, in general. For example, it has been found that training in portion size estimation among 9-10 year olds significantly improves estimates for solid foods measured by dimensions or cups, and liquids estimated by cups. Amorphous foods are estimated least accurately even after training and other foods still present significant errors.

Evaluation of Dietary Assessment Methods

The number of days needed to estimate a particular nutrient depends on the variability of the nutrient being assessed and the degree of accuracy desired for the research question. Most nutrients require more than four days for a reliable estimate. However, most individuals weary of keeping records beyond four days which may decrease the quality of the records.

Another challenge in evaluating dietary assessment methods is comparing the results of the dietary assessment method to some measure of "truth." This is best achieved by identifying a biomarker of a nutrient or dietary factor. The underlying assumption of a biomarker is that it responds to intake in a dose-dependent relationship. The two methods that have widest consensus as valid biomarkers are DLW for energy and 24-hour urinary nitrogen for protein intake. A biomarker does not rely on a self-report of food intake, thus theoretically the measurement errors of the biomarker are not likely to be correlated with those of the dietary assessment method. Other biomarkers collected from urine samples may include potassium and sodium. Some plasma or serum biomarkers that have been explored are levels of ascorbic acid for vitamin C intake, and 13-carotene for fruits and vegetables or antioxidants. These latter markers are widely influenced by factors such as smoking status and supplement use, thus their interpretation to absolute intake is limited.

SUMMARY OF THE DISCLOSURE

The present system and method provides a mobile device (e.g., a PDA or mobile telephone) food record that provides an accurate account of daily food and nutrient intake among adolescents or others. The present system and method uses a mobile network connected device that has a camera to take images of food before and after it is consumed and estimate food intake using image analysis methods. Images of food can also be marked with a variety of input methods that link the item for image processing and analysis to estimate the amount of food. Images acquired before and after foods are eaten can estimate the amount of food consumed. Provided are alternatives for recording food consumed when images cannot be obtained for the mobile food record.

Provided is a cell phone, PDA, digital camera, or other device to capture both visual and recorded detail that is electronically submitted to a researcher, thereby easing respondent and researcher burden, and providing accurate estimates of nutrient, food, and supplement intakes. Provided in the present disclosure is imaging software for use with digital images that estimates quantities of foods consumed, modification of the FNDDS nutrient database, and a user-friendly interface.

The present disclosure includes the use of image analysis tools for identification and quantification of food consumption. Provided to aid in image analysis are fiducial markers of known sizes to be included in digital photographs taken by the user. Images obtained before and after food is consumed are used to estimate the diet of an individual, including energy and nutrient content. Also provided are applications of the mobile food record for helping users make healthier eating decisions based on analyzed images taken before eating.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated or pictured in greater detail in the accompanying drawings, wherein:

FIGS. 1(a) through 1(d) represent examples of input techniques for use with mobile device food record. Specifically.

FIGS. 2(a) through 2(d) represent additional input devices and labels for use with mobile device food record. Specifically.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated or pictured herein.

DETAILED DESCRIPTION OF THE PRESENTLY PREFERRED EMBODIMENTS

An embodiment of the present disclosure uses a network-connected mobile device that has a built-in camera to take images of food before and after it is consumed and estimate food intake using image analysis methods. Mobile devices, such as PDAs and mobile telephones with cameras, are general purpose computing devices that have a great deal of computational power that can be exploited for this purpose.

The present system and method provides a mobile device that is attractive to users and which can be used to measure food intake. Most mobile devices include digital cameras which make taking pictures and labeling the content of the pictures less burdensome than writing on paper. The use of a mobile device that works the way young people interact with portable devices may address many of the issues outlined as barriers to recording food intake among adolescents. Young users treat their mobile device as an extension of their personality and this has been considered in the design of our system.

Mobile devices have the potential to create an entire new platform for applications and services that could be used for dietary assessments. For example, some individuals may forget to record their food when eaten, in which case the record can become a cross between a recall and a record. With paper and pencil recording, there is no way a researcher can check that foods were recorded at the time of the meal or that all meals were recorded at the end of the day. With a mobile device, every entry records a time stamp, thus allowing researchers to more accurately determine if data entry occurred at typical meal times (record), long after the meal, or all at once at the end of the day (an unassisted recall). The use of an image provides another dimension of verifying food intake.

In one embodiment of the present disclosure uses a mobile device with a built-in camera, integrate image analysis, and visualization tools with a nutrient database, to allow an adolescent user to discretely "record" foods eaten. The user captures an image of his/her meal or snack both before and after eating. The present disclosure provides automatic image analysis methods to determine the food consumed, thereby reducing the burden of many aspects of recording for the users and reduces analysis for the researchers.

In one embodiment, software in the mobile device prompts the user to "record a new meal," "review meals," or "alternate method." Thereafter, should the user choose "record a new meal," the user may be presented with prompts for breakfast, lunch dinner, or snack. The software may then guide the user to capture images of the food and beverage before and after eating, including various reminders (inclusion of fiducial markers, for example). Before and after images may be provided side-by-side to the user before exiting the program. Alternatively, the software may give the user the option of "I ate everything" rather than capturing an image of completely empty plates and glasses. In another embodiment, the user may choose the option "review meals" to review previously recorded images. This may be especially useful when images of a meal were recorded, but identification and tagging of the food has not yet occurred. In this embodiment, viewing and labeling the saved images can proceed with or without the searching databases, and based on the labels assigned, energy and nutrient content of food consumed can be determined.

However, in the event that a picture of a food cannot be obtained, due to technical difficulties or otherwise, the system includes an alternative way of determining the food consumed. In one illustrated embodiment of the present disclosure, the user may identify the foods consumed by writing on the screen, by tapping the screen, or by using various data entry menus and forms. Entry methods include selecting foods from a tree list, searching for a food in the database using words or portions of words, or other suitable data entry techniques. Examples of these input techniques are shown in FIG. 1 and FIG. 2.

Figure 1A:
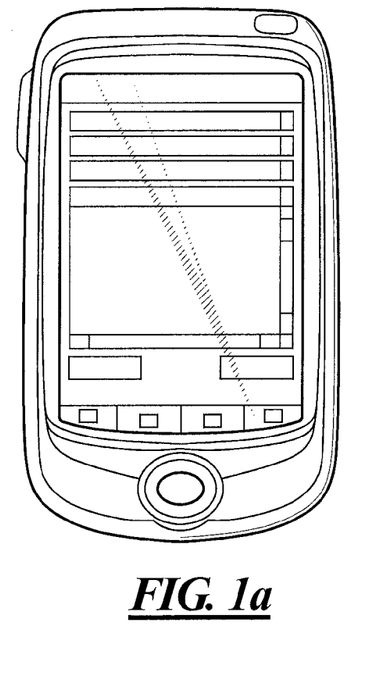
FIG. 1(a) illustrates a tree method to select a food item from the database.
Figure 1B:
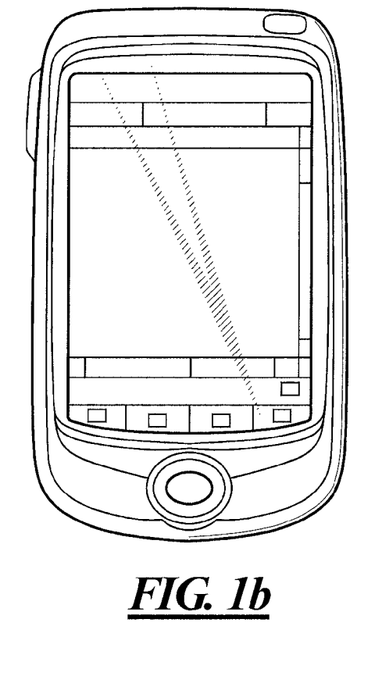
FIG. 1(b) illustrates a search method to select a food item from the database.
Figure 1C:
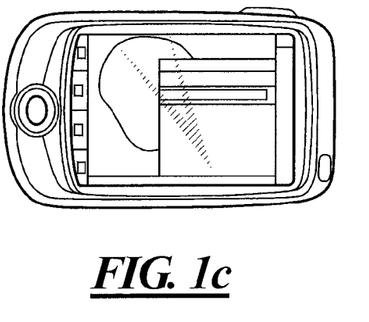
FIG. 1(c) illustrates a tree method to mark digital pictures with a food item in the database.
Figure 1D:
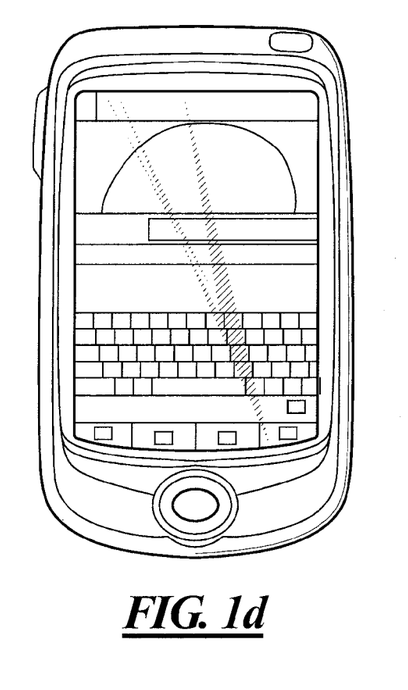
FIG. 1(d) illustrates a search method to mark digital pictures with a food item in the database.

FIG. 1(a) illustrates a mobile device in which a user can use a menu tree method to select a food item from a database. FIG. 1(b) illustrates using a search term such as "muffin" to select a food item from the database. FIG. 1(c) illustrates use of a tree method to mark digital pictures with the food item from the database. After the picture is taken, the user can pull up the menu and mark the picture food item from the database. FIG. 1(d) illustrates use of the search method to mark digital pictures of a food item. After a picture of the food item is taken using the mobile device, the user can then search for a term such as "corn bread muffin" and then mark the photo with the appropriate food from the database.

In addition to the described methods of recording, audio entry of the foods consumed along with their portion size is also contemplated. Recording in this manner requires voice recognition software, but may be useful in situations where technical difficulties or forgetfulness prevents the user from taking a picture before eating.

Figure 2A:
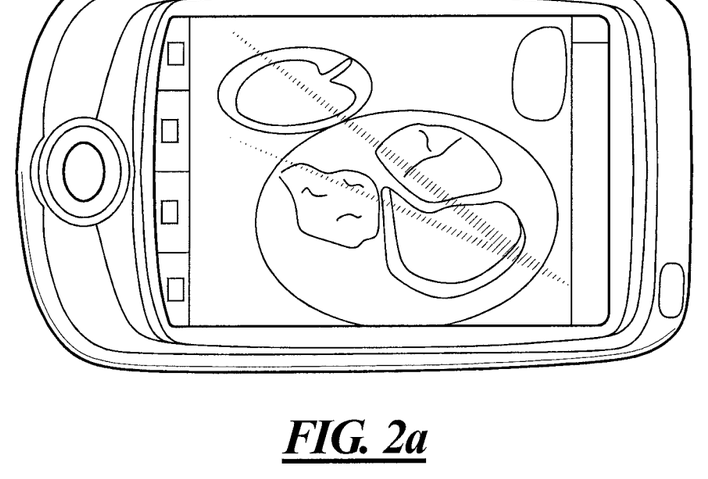
FIG. 2(a) illustrates the use of a stylus to hand write notes to label food items in a digital picture of a meal.
Figure 2B:
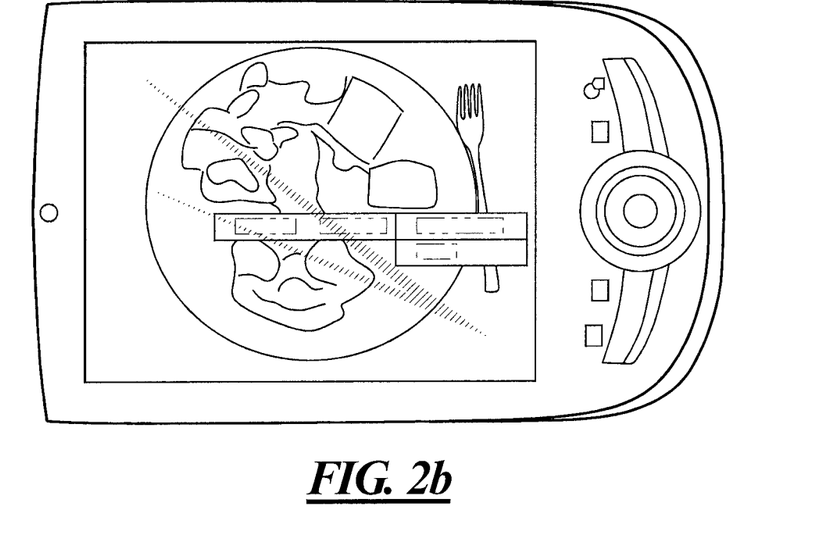
FIG. 2(b) illustrates the use of an on-screen tree method to label food items in a digital picture of a meal.
Figure 2C:
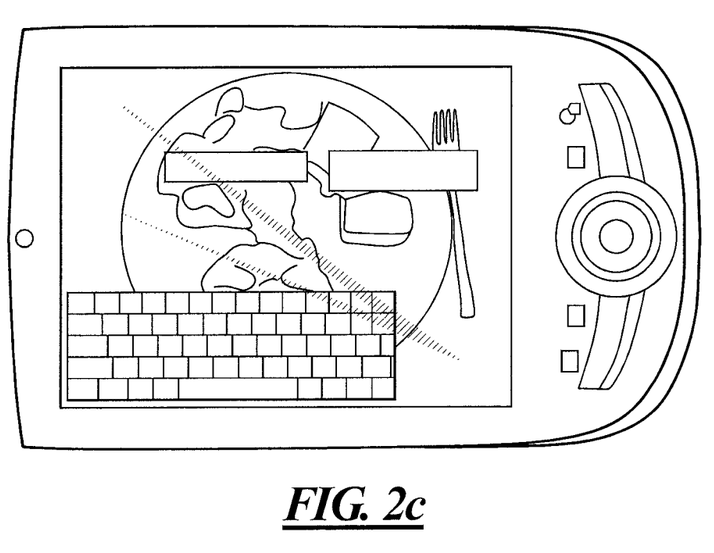
FIG. 2(c) illustrates the use of an on-screen keyboard to search for a food item from a database.
Figure 2D:
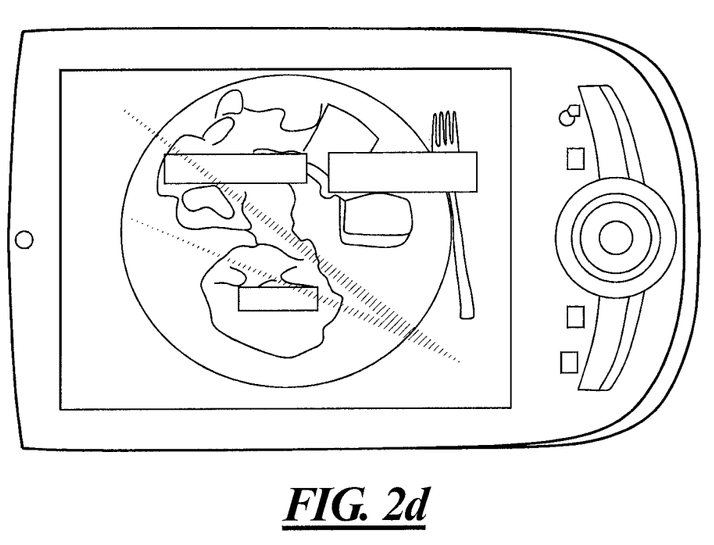
FIG. 2(d) illustrates a labeled meal.

Additional input devices and labels for use with a mobile device food record are illustrated in FIGS. 2(a) through 2(d). FIG. 2(a) illustrates use of a stylus to hand write notes and label food items in a digital picture of the meal to help with proper identification or classification of the food items that were eaten. FIG. 2(b) illustrates use of an on-screen tree method to label food items in a digital picture. FIG. 2(c) illustrates use of an on-screen keyboard to search for a food item in a database or to type in information related to the item in the photograph. FIG. 2(d) illustrates a labeled meal using the system of the present invention (not shown are the secondary prompts). Once certain labels are added such as "salad", secondary prompts may be used to ask the user regarding additional elements such as the type of salad dressing, the amount of butter or oil on the bread, any cheese added or the like. These additional prompts help the user capture added quantities of food which may not be detectable in the image of the meal.

Alternatively, a computing device having a database, or access to a database of food image parameters and software for analyzing and comparing the same with pictures taken may itself be able to limit the number of choices of what a food might be. For instance, the computing device may be capable of determining that a tan piece of meat is pork, chicken, or fish, or that a food item is a green vegetable. In this embodiment, the user would confirm the suggestions rather than starting an entry from "square one."

In addition, the device may prompt users with real-time reminders sent using the network capabilities of the mobile device. Reports can be sent to a central system to allow regular monitoring. The use of time-stamped food entries and images can aid the research dietitian or the clinical dietitian in reviewing the food record with or without the adolescent to identify foods.

Image Analysis and Visualization

Figure 3:
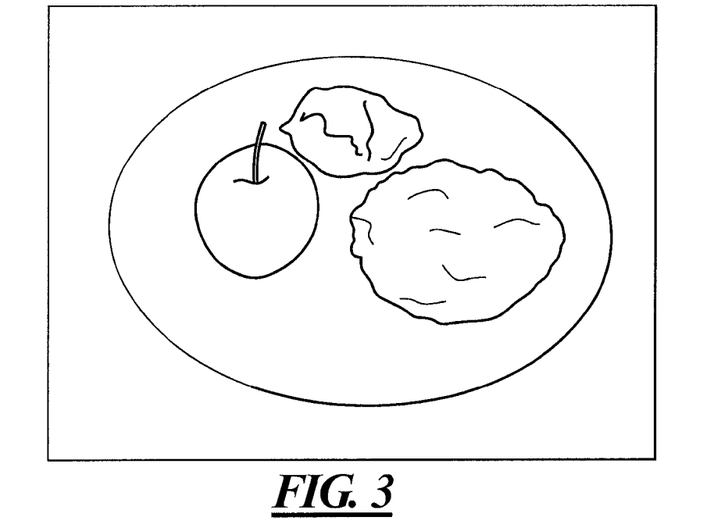
FIG. 3 is an image of a meal taken on a tablecloth having a pattern of squares of known size to permit calibration of the image.

An illustrated embodiment of the present disclosure includes a method to automatically estimate the food consumed at a meal from an image acquired from a mobile device. An example of such an image is shown in FIG. 3. The present system identifies each food item and estimates the volume of each food item consumed. From this information, the energy and nutrients consumed can he determined. This is not an easy problem in that some foods may not be identifiable from an image. For example, the type of milk in a cup (e.g., low fat or skim milk) may not be determined from the image alone. This requires other types of "side information"

be available to the system either through how the food was packaged (e.g., an image of the milk carton) or through inputs (manual or audio) from the user.

Figure 4:
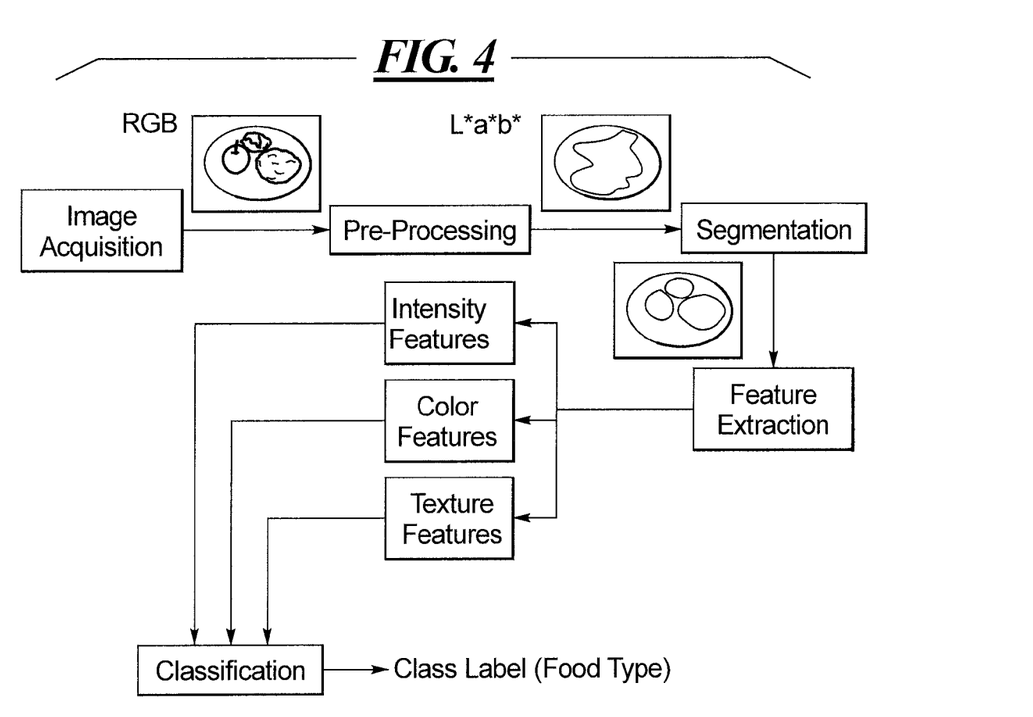
FIG. 4 is a diagram illustrating an exemplary embodiment of an image processing and analysis system of the present disclosure.

An illustrated embodiment of the present invention includes a calibrated, possibly 3D, imaging system. A block diagram of an exemplary image analysis system is shown in FIG. 4. The present system and method for addressing the various tasks is described below.

Image Calibration and Acquisition

An illustrated embodiment of the present disclosure includes a 3D calibrated image system to facilitate determining how much food was consumed. In one embodiment, the user takes the image with a known fiducial object placed next to the food to "calibrate sizes" in the images. A pen or PDA stylus may be used as a fiducial in an illustrated embodiment. Known dimensions of a plate or cup in a scene may be used to calibrate the image. Other information in the scene such as the pattern on the tablecloth (see FIG. 3) could also be used. The squares on the tablecloth have a known size for calibration.

For 3D or volume estimation, multiple images of the scene taken at different orientations may also be used. This also requires that calibration information be available so that depth information can be recovered.

Image Segmentation

In an illustrated embodiment of the present disclosure, the system automatically determines the regions in the image where a particular food is located. This can be accomplished using a combination of edge detection and color analysis, for example. Once a food item is segmented, the system identifies the food item and then estimates how much food is present in the image.

Figure 5A:
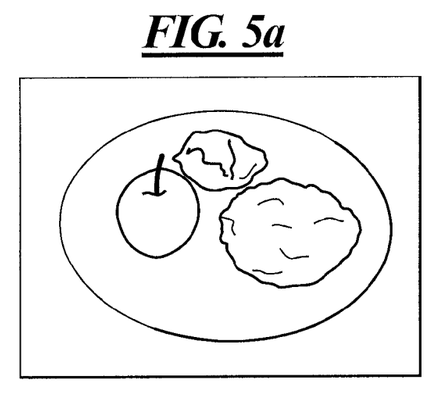
FIGS. 5(a) and 5(b) show images of segmented food items, with FIG. 5(a) including a food item segmented using a fix threshold, and FIG. 5(b) including additional food item segmentation using color information.

An illustrated image segmentation method is a two step process. In the first step the image is converted to a grayscale image and then thresholded with a threshold of 127 to form a binary image. It was determined empirically that the pixel values in the binary image corresponding to a plate had values of 255. For segmenting the food items on the plate, the binary image was searched in 8-point connected neighbors for the pixel value 0. Connected segments less than 1000 pixels were ignored because they correspond to the tablecloth (see FIG. 3). In this step a fixed threshold was illustratively used. Thus, pixels corresponding to the food items might be considered as the plate. As a result, a second step of segmentation is included in an illustrated embodiment. The result of the first step of segmentation is shown in FIG. 5(a).

Figure 5B:
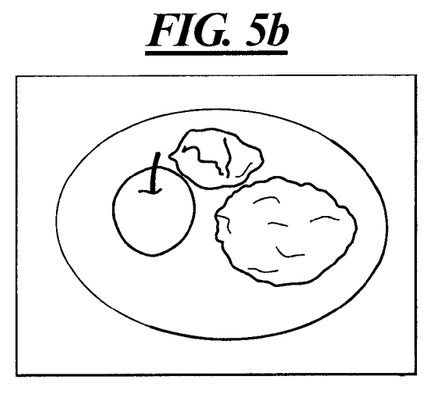

In the second step, the image is first converted to the YCbCr color space. Using the chrominance components, Cb and Cr, the mean value of the histogram corresponding to the plate was found. Pixel locations which were not segmented during the first step are then compared with the mean value of the color space histogram of the plate to identify potential food items. These pixels were labeled differently from that of the plate. Then 8-point connected neighbors for the labeled pixels were searched to segment the food items. An example is shown in FIG. 5(b), the food item, i.e. scrambled egg, which was not segmented in the first step is successfully segmented in the second step using the color space.

Feature Extraction

Two types of features may be extracted from each segmented food region, namely color features and texture features. For color features, the average value of the pixel intensity along with the two color components is extracted. For texture features, Gabor filters to measure local texture properties in the frequency domain may be used.

Gabor filters describe properties related to the local power spectrum of a signal and have been used for texture features. A Gabor impulse response in the spatial domain consists of a sinusoidal plane wave of some orientation and frequency, modulated by a two-dimensional Gaussian envelope and is given by:

$$h(x, y) = \exp\left[-\frac{1}{2}\left(\frac{x^2}{\sigma_x^2} + \frac{y^2}{\sigma_y^2}\right)\right]\cos(2\pi U_x + \varphi)$$

In one illustrated embodiment of the present disclosure, a Gabor filter-bank was used. It is highly suitable for our use where the texture features are obtained by subjecting each image (or in our case each block) to a Gabor filtering operation in a window around each pixel and then estimate the mean and the standard deviation of the energy of the filtered image. A Gabor filter-bank consists of Gabor filters with Gaussian of several sizes modulated by sinusoidal plane waves of different orientations from the same Gabor-root filter as defined in the above equation, it can be represented as:

$$g_{m,n}(x,y) = a^{-m} h(\hat{x}, \hat{y}), \ a > 1$$

where $\hat{x} = a^{-m}(x \cos \theta + y \sin \theta)$, $\hat{y} = a^{-m}(-x \sin \theta + y \cos \theta)$, $\theta = n, x/K$ (K=total orientation, n=0, 1, ..., K−1, and m=0, 1, ..., S−1), and h(−,−) is defined in Equation (1). Given an image $I_g(r,c)$ of size H×W, the discrete Gabor filtered output is given by a 2D convolution:

$$I_{g_{m,n}}(r,c) = \Sigma_{s,t} I_E(r-s, c-t) g_{m,n}^*(s,t),$$

As a result of this convolution, the energy of the filtered image is obtained and then the mean and standard deviation are estimated and used as features. In our implementation, we divided each segmented food item in to 64×64 non-overlapped blocks and used Gabor filters on each block. We used the following parameters: 4 scales (S=4), and 6 orientations (K=6).

Classification

Once the food items are segmented and their features are extracted, the next step is to identify the food items using statistical pattern recognition techniques. For classification of the food item, a support vector machine (SVM) may be used. The feature vectors presently used for the SVM contain 51 values, 48 texture features and 3 color features. The feature vectors for the training images (which contain only one food item in the image) were extracted and a training model was generated using the SVM. A set of 17 images were used as training images and each food item was given a unique label.

Figure 6A:
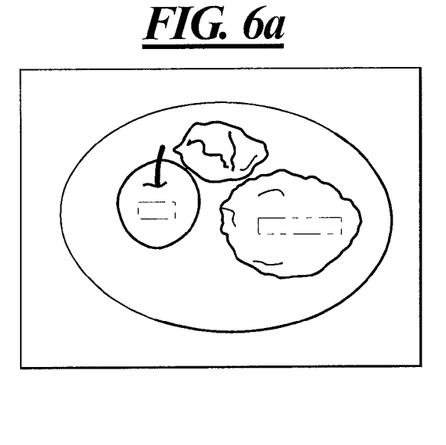
FIGS. 6(a) and 6(b) show images of classified food items, wherein in FIG. 6(a), all food items are successfully classified using a SVM, and wherein in FIG. 6(b), some food items are misclassified by the SVM.
Figure 6B:
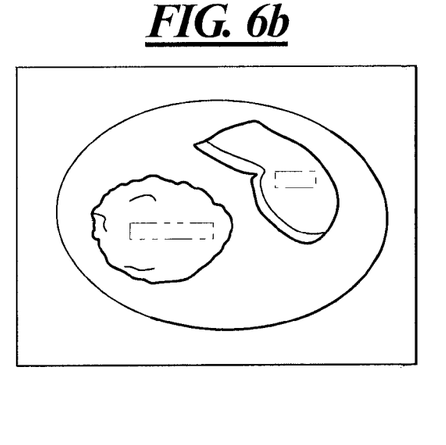

An illustrated embodiment of the present disclosure includes a database of images taken using a digital camera and plastic food replicas in a laboratory. The images were acquired using specific conditions, such that the foods were placed on a white plate on a checkerboard (black and white) patterned tablecloth. The tablecloth was used as a fiducial mark for estimating the dimensions and area of the food item. The white plates were used to assist the segmentation of the food items. The training images used were taken with only one food item and the testing image contained 2 or 3 food items. The database consists of 50 images, 17 images were used for training and 33 images were used for testing. The average classification results indicated a 93.745% accuracy rate when 17 images were used as training images and 14 images containing 32 food items were used as test images. FIGS. 6(a) and 6(b) show images of classified food items, wherein in FIG. 6(a), all food items are successfully classified using a SVM, and wherein in FIG. 6(b), some food items are misclassified by the SVM, i.e., beef roast is misclassified as steak.

Volume Estimation

Based on the segmentation and reference size estimation, the present system and method determines the volume of food consumed in cm³. For many foods this may not be possible from one image of the meal. The system and method may use multiple images and computer visualization methods using 3D shape reconstruction techniques to improve determination of the volume of food consumed. The present system and method generates a similar shaped object as the food item as a reference and composite it over the food item in the image and ask the user to adjust the shape to be smaller or larger to increase our accuracy in volume estimation. This involves a combination of image processing and graphical rendering techniques to correctly position and size the estimated volume shape. The user may simply adjust a slider bar or use another suitable input to confirm the choice of the size. This interactive user adjustment is an option in the final deployed system as the estimation algorithms increase in accuracy.

Estimating Food Consumed

By using digital images taken before and after the meal is eaten, the present system and method estimates the amount of food consumed. Image subtraction may be used to determine the total volume of each food object consumed. Once the volume in cm³ of each food item is determined, this information is combined with the portion code and portion weight in the USDA Food and Nutrient Database for Dietary Studies (FNDDS) to determine the gram weight of the food. For example, for homemade chocolate pudding, the food code is 13210220 in FNDDS. The portion code, 10205, associated with the chocolate pudding is 1 cup. The portion weight is 261 grams and 1 US cup is known to be 236.588237cm³. If the portion is calculated to be 100 cm³, then the gram weight of the portion code and the cm³ of the portion code are used to solve for the gram weight of the portion size. In this case the gram weight would be 110.318248 grams. Once the gram weight is determined the nutritional information in the FNDDS for each food item can be used to determine the final energy and nutritional content of the consumed food. The FNDDS does not have built in volume measures so each portion code and portion weight needs to have an additional cubic centimeter field added to address the conversion.

In the FNDDS, there are food items that have volume measures that are accompanied with a gram weight and these volume measures are: cubic inch, cup, tablespoon, teaspoon, and fluid ounce. For the remaining food items, methods need to be developed to efficiently, yet accurately provide the necessary volumetric measurement to achieve the conversion to gram weight. The number of foods with adequate information and the number of foods with inadequate information are shown in Table 1.

TABLE 1

Frequency of food items (main items and additional items) by volumetric measure in FNDDS

| Volumetric measure in FNDDS | Number of foods with the volumetric measure |
| --- | --- |
| Cubic inch | 2,002 |
| Fluid ounce | 744 |
| Cup | 7,388 |
| Tablespoon | 686 |
| Teaspoon | 75 |
| None of the above | 2,925 |
| TOTAL | 13,820 |

Food items with no volumetric measure are commonly eaten foods, such as bagels, doughnuts, pizza, turnovers, rolls, sandwiches, pie, granola bars, some cookies, muffins, ice cream cones, bread, candy bars. The volumetric measurements for these items include such portion code descriptions as 1 miniature, 1 package, 1 sandwich, 1 loaf, 1 roll, 1 medium, and 1 small. There are also some candies that have a portion code description of 1 piece. As another example, there are 94 items with a portion code description of cupcake. The numbers in Table 1 do not include the subcode foods, which represent many candies and some commercial snack cakes.

Suggested approaches to determining volume include volume measurements in FNDDS. In some cases, a food item may have more than one of these volume measures associated with it. The number of foods (main food items only) with multiple volumetric measurements is shown in Table 2. In FNDDS, additional food items have the same code as a main food item and subcode food items are linked to a main food item, this table only includes the total main food items (6974 items). For these foods, a decision tree can be developed as to which volume measure would preferably be used for conversion calculations. Since cubic inch is similar to cubic centimeter, this would be a natural first choice measure when a food contains cubic centimeter as part of its portion code description in the FNDDS. A beverage, such as milk, would have portion code descriptions of cup and fluid ounces. Thus, a decision would need to be made as to a preference for cup or fluid ounces. Proposed is a ranking of volumetric measures by preference to be 1) cubic inch, 2) fluid ounce, 3) cup, 4) tablespoon, and 5) teaspoon. Any food item with at least one of these measures in the portion code description contains the elements needed to convert total volume consumed to gram weight.

As evident in this Table 2 below, 1,369 main food items do not have any volumetric measure. This accounts for about 20% of the main food codes listed in FNDDS. Those with multiple volumetric measures are listed in the order of suggested preference stated above. For example, those food items with both cubic inch and cup would preferentially defer to the cubic inch volumetric measurement. And, those with any other volumetric measurement and cubic inch would also defer to cubic inch. Then, fluid ounce would be the volumetric measurement of preference, and so on.

TABLE 2

Frequency of food items (main items) with more than one volumetric measure in FNDDS

| | Cubic Inch | Fluid Ounce | Cup | Tablespoon | Teaspoon | None | Total |
| --- | --- | --- | --- | --- | --- | --- | --- |
| Cubic Inch | 245 | 2 | 779 | 3 | | | |
| Fluid Ounce | | 269 | | 6 | 7 | | |
| Cup | | 389 | 3398 | 284 | 4 | | |
| Tablespoon | | | | 192 | 4 | | |
| Teaspoon | | | | | 23 | | |
| None | | | | | | 1369 | |
| Total | | | | | | | 6974 |

Physical measurements of foods without volume measurements in FNDDS—Those food items that do not have a volumetric measurement in the portion code may have size measurements in the portion code. The volume for these items could be calculated. An example would be: 1-layer cake (8" or 9" diameter, 1½" high). Other food items may have part of the measurement in the portion code, and thus would require additional measurements in order to calculate volume. For example, a 2"×1" piece of cake without the height measurement given or a large apple with a 3" diameter. For these food items, samples of food items could be purchased and measured. Then weight of sample purchased (example a large apple with a 3" diameter) would be compared with weight listed in FNDDS. Items would be measured with a caliper and at least three measurements would need to be made for purposes of accuracy.

Measurement of volume of foods without volume measurements in FNDDS—For food items which have no volumetric measurement or size measurements in the portion code, volume could be determined using other methods, such as liquid, gas, or solid displacement. For example, volume measurements could be done using the method of liquid displacement for either foods wrapped in saran and sealed or Nasco® plastic foods. The plastic foods are made to reproduce actual food in commonly eaten portion sizes. The company provides the weight, size, and/or portion size of these food items. Additionally, volumes of foods can be determined using rapeseed (solid) displacement. These displacement methods require skilled technique, especially the solid displacement method. It should also be noted that one of the challenges presented with varying forms of measuring foods is that there is not consistency and thus accuracy is compromised.

Computation of density of foods using formula for true density—Density is defined as the amount of mass of a material per unit volume. Particle and bulk density are used to define the mass per volume of particles alone or per volume of a group of particles. Density can be calculated by using the make-up of the major food components of water, carbohydrate, protein, fat, ash, and ice and by using a formula. (See, Physical Properties of Foods by Serpil Sabin and Servet Gulum Sumnu, page 22-24, and Handbook of Food Engineering, Second Edition by Dennis R. Heldman and Daryl B. Lund CRC Press Publisher 2007, pages 399-403, which are both incorporated by reference herein). Densities of all food items in the FNDDS could be calculated using this formula, thus providing consistency. However, it would be prudent to test how well this calculated true density correlates with the density computed from food items in FNDDS which have adequate information (weight and volume).

There is not a value for ash in the nutrient values, thus mineral components would have to be added to determine the value for ash content. The density calculated using this formula is a true density and is a density of a pure substance or a composite material calculated from the densities of its components considering conservation of mass and volume. The formula for true density uses: 1) density of the food component, ($kg/m^3$) which is dependent on temperature, 2) volume fraction of the food component, and 3) mass fraction of the food component. There are specific formulas for the density of each of the food components using the temperature (T) of the food. The formula for density (p) of the food item at a particular temperature is as follows:

$$\rho(kg/m^3) = \frac{1}{\sum (x_i/\rho_i)}$$

where X is the mass fraction of the component of the food and ρ is the density of that component at a particular temperature T. The formulas for density of the food components at a particular temperature are as follows:

True density of water=$997.18+3.1439\times10^{-3} T-3.7574\times10^{-3} T^2$

True density of carbohydrate=$1599.1-0.31046T$

True density of protein=$1330-0.1584T$

True density of fat=$925.59-0.41757T$

True density of ash=$2423.8-0.28063T$

True density of ice=$916.89-0.1307T$

Where true densities are in $kg/m^3$ and temperatures (T) are in ° C. and varies between −40 and 150° C.

Figure 7:
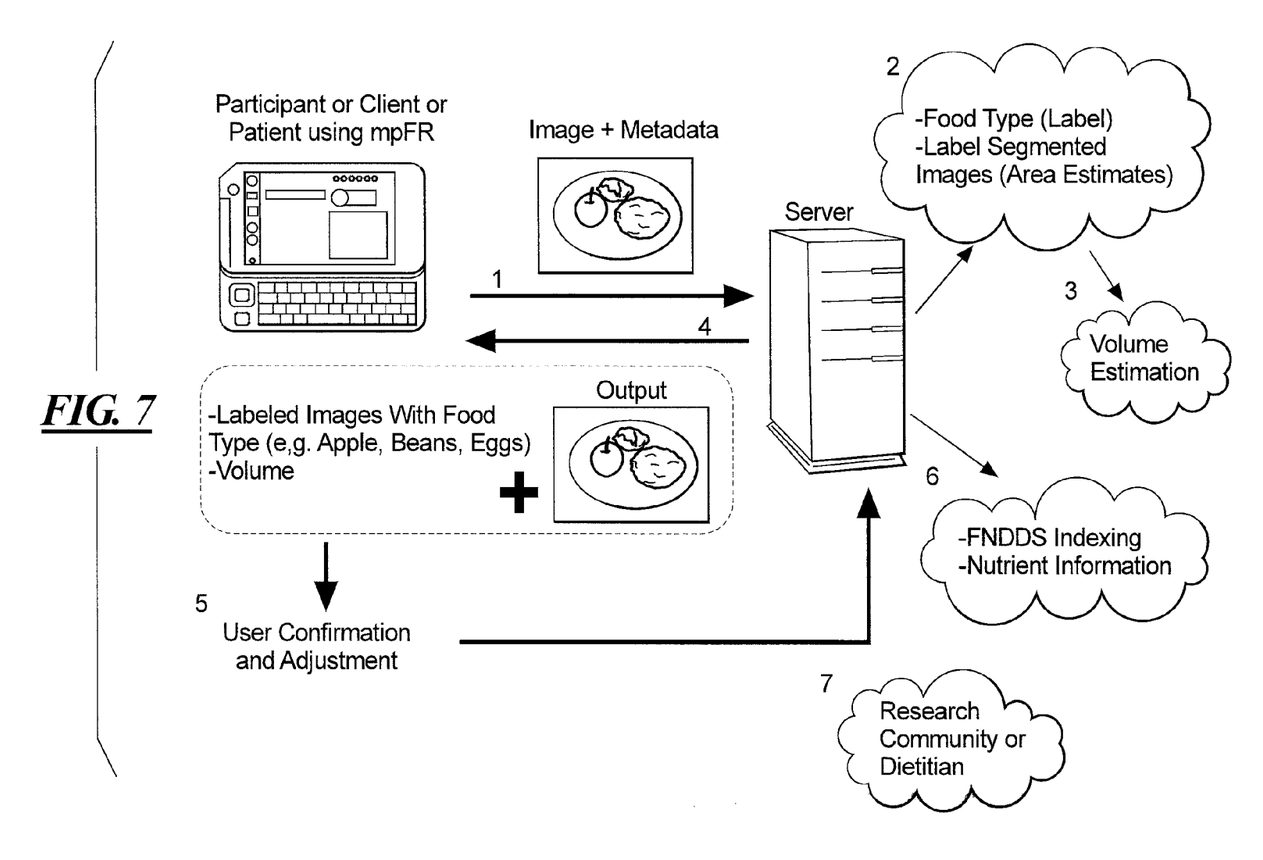
FIG. 7 is a diagram illustrating an exemplary embodiment of the mobile telephone food record of the present disclosure.

FIG. 7 summarizes some steps of the mobile telephone food record system of the present disclosure in a diagram format. In step 1, the user acquires an image of the food before and after eating with the mobile device. A digital image is different from a photograph in that useful information, called metadata is captured that is not visible, such as the time stamp and digital codes. Thereafter, the image, along with metadata, is sent to a server. In steps 2 and 3, image analysis occurs at the server. The food items are identified (labeled and the volume of each food estimated). The results are then sent back to the user in step 4. In step 5, the user confirms and/or adjusts the information and sends it back to the server. The data is indexed with a nutrient database, the FNDDS, to compute the energy and nutrient content of the foods consumed in step 6. And finally, in step 7, the results can be sent to researchers or dietitians.

Alternatively, given the capacity of mobile devices to store large amounts of information and software, computation of volume and nutrient values may proceed without a server. Instead, all computations would occur in the mobile device alone, the user being capable of confirming and/or adjusting the results, as described above. In either case, in another application of the mobile device recording system, after taking a picture of the food, and before eating, the user can be directly provided with an estimate of the nutritional information for the served portion. Further, this information could be combined with a computation of the total nutrient and energy intake of that day, for example. In this application of the mobile food record, the user is provided with information that may help in making healthier food choices and possibly maintain or loose weight.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A system for measuring food intake of a user, the system comprising:
 a mobile device having a built-in camera, the mobile device being configured to capture a first image including a food item to be eaten by the user; and
 a remote server in communication with the mobile device, the remote server being configured to:
  receive the first image;
  calibrate a size of the food item in the first image;
  segment the first image into one or more segmented regions where the food item is located;
  identify a food type of the food item in one or more of the segmented regions; and
  estimate a volume of the food item using only the one or more segmented regions of the first image.

2. The system of claim 1, the remote server further configured to calculate nutritional information of the food item in the first image and communicate the nutritional information to the mobile device before the user starts eating.

3. The system of claim 1, the mobile device being further configured to provide a user interface input selection for the user to indicate that all food items have been consumed.

4. The system of claim 1 wherein the mobile device receives input from the user and generates a label corresponding to an identity of the food item in the first image based on the input from the user.

5. The system of claim 1, the remote server being further configured to:
identify the food item in the first image with reference to a plurality of images for predetermined food items stored in a memory.

6. The system of claim 1, the camera in the mobile device being further configured to:
generate the first image including a fiducial mark of a predetermined size; and the remote server being further configured to:
identify the fiducial mark in the first image; and
estimate the volume of the food item based on the predetermined size of the fiducial mark in the first image.

7. The system of claim 1, the remote server being further configured to:
identify nutritional information for the food item in the first image based on the identified food type and the estimated volume of the food item.

8. The system of claim 1 wherein the food item comprises a beverage.

9. The system of claim 1, the mobile device being further configured to:
capture a second image of one or more partially consumed food items with the camera, the second image being captured after the user has eaten; and
the remote server being further configured to:
receive the second image from the mobile device;
calibrate a size of a partially consumed food item in the second image, the partially consumed food item corresponding to the food item in the first image;
segment the second image into one or more segmented regions where the partially consumed food item is located;
estimate a volume of the partially consumed food item using only the segmented regions of the second image; and
identify a volume of food eaten by the user with reference to a difference between the estimated volume of food from the first image and the estimated volume of the partially consumed food from the second image.

10. the system of claim 9, the remote server being further configured to:
identify a food type of the partially consumed food item in one or more of the segmented regions of the second image.

11. A system for measuring food intake of a user comprising:
a processor configured to:
receive a first image including image data of a food item prior to the food item being eaten;
calibrate a size of the food item in the first image;
segment the first image into one or more segmented regions where the food item is located;
identify a food type of the food item in one or more of the segmented regions; and
estimate a volume of the food item using only the one or more segmented regions of the first image.

12. The system of claim 11, the processor being further configured to:
calculate nutritional information of the food item in the first image and generate an output of the nutritional information for display with an electronic device that generated the first image.

13. The system of claim 11, the processor being further configured to:
receive a second image including image data of the food item after a portion of the food item has been eaten;
calibrate a size of a partially consumed food item in the second image, the partially consumed food item corresponding to the food item in the first image;
segment the second image into one or more segmented regions where the partially consumed food item is located;
estimate a volume of the partially consumed food item using only the segmented regions of the second image; and
identify a volume of food eaten by the user with reference to a difference between the estimated volume of food from the first image and the estimated volume of the partially consumed food from the second image.

14. the system of claim 13, the processor being further configured to:
identify a food type of the partially consumed food item in one or more of the segmented regions of the second image.

* * * * *